Sept. 9, 1930.                    S. B. SHIFFLETT                    1,775,476
                                   LADY'S HANDBAG
                                 Filed April 17, 1929
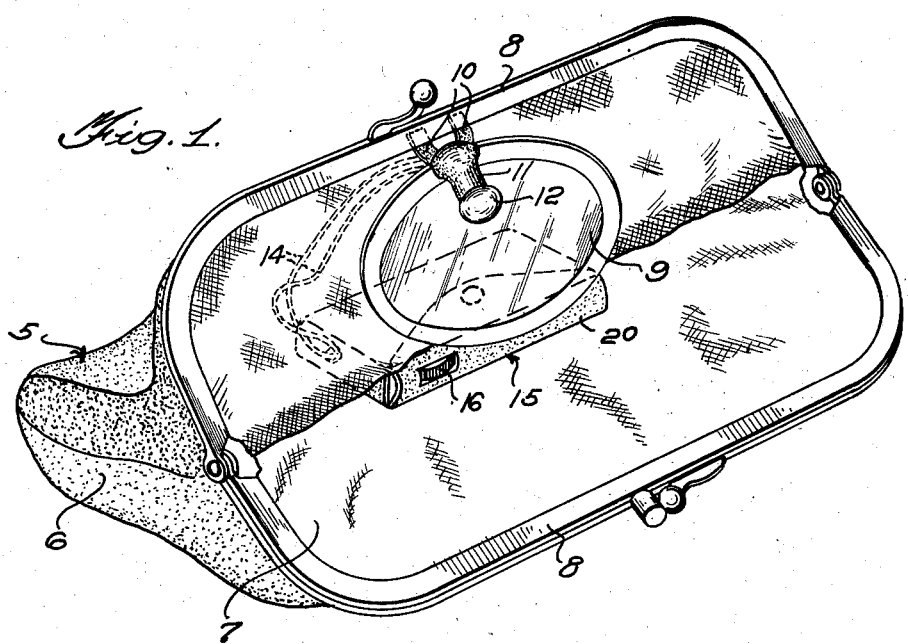
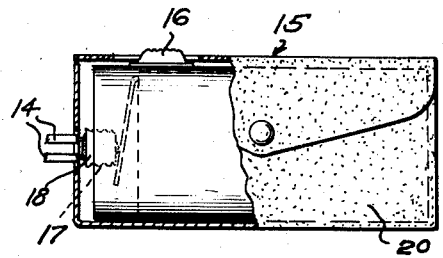
Fig. 3.
Fig. 4.
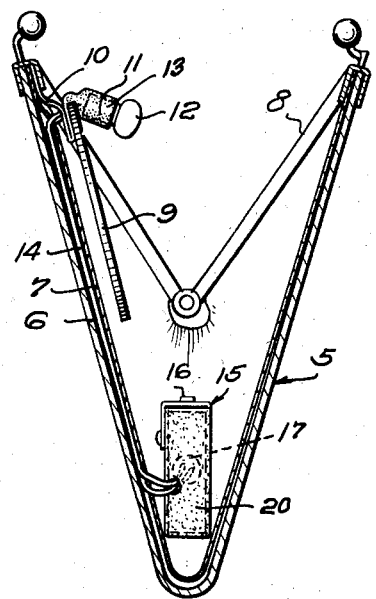
Fig. 2.
INVENTOR.
Samuel B. Shifflett,
BY
ATTORNEYS Patented Sept. 9, 1930

1,775,476

UNITED STATES PATENT OFFICE

SAMUEL B. SHIFFLETT, OF BRADDOCK, VIRGINIA, ASSIGNOR TO WALTER D. DIAMOND

LADY'S HANDBAG

Application filed April 17, 1929. Serial No. 355,824.

This invention relates to ladies' handbags, and it has for its object to provide simple and inexpensive means for illuminating the interior of said bags, when desired.

A further object of the invention is to provide, in a handbag, a mirror and an illuminating element associated with the mirror in such a way as to facilitate the use of the mirror in the making of the toilet, of the user.

A further object of the invention is to provide a handbag provided with a mirror and a light, the light being associated with the mirror in such way that the mirror is caused to serve the double function of a mirror and a reflector for directing the light rays to any desired point.

Further objects and advantages of the invention will be set forth in the detailed description which follows.

In the accompanying drawing,

Fig. 1 is a perspective plan view of an open handbag, having the invention applied thereto, Fig. 2 is a transverse vertical sectional view through the handbag, Fig. 3 is a detail view of the battery-carrying element, hereinafter described, Fig. 4 is a detail view illustrating a type of lamp which may be employed.

Like numerals designate corresponding parts in all of the figures of the drawing.

In the drawing, 5 designates a handbag, which may be of any conventional form, comprising the outer leather wall 6, an internal fabric lining 7, and a metallic frame 8. It is common practice to provide mirrors, such as that indicated at 9, upon the interior of ladies' handbags, and to suspend them from a side wall of the bag. I utilize such an arrangement in the present case, suspending the mirror by two small spaced straps 10, which are secured by cementing, or otherwise, to the rear wall of the mirror, and with their terminal portions clipped, along with the fabric 7, and the leather 6, within the metallic frame member 8. Thus, the mirror is flexibly supported with respect to the frame member, and may be moved to varying angles. A small lamp socket 11, carrying a monly used in the smaller sizes of hand flashlights, is secured to the mirror frame and projects forwardly and downwardly, over the mirror. This lamp socket may be secured in place by cementing the same into a leather casing 13, the rear end of said casing being cemented, or otherwise suitably united with the mirror frame. Current conducting wires 14 lead from the lamp socket 11, and pass through the lining 7, immediately behind the mirror. These wires are led downwardly between the lining 7 and the wall 6, to a source of current supply.

I find it advantageous and economical to use, as the source of current supply, a battery and casing, indicated as a whole, at 15, of one of the ordinary well known small hand flashlights. These small flashlights have switches 16 at their sides, and a lamp socket 17 in their ends, and I conveniently attach the wires from bulb 12 to the outlet provided by this lamp socket. That is to say, I use a base 18, which corresponds to the base portion of the bulb which would, ordinarily, be used with the flashlight, and I solder the end of one of the wires to the metallic shell of said base, and I solder the end of the other wire to the center contact of said base, it being understood that this base screws into the socket 17, in the same manner that the lamp bulb would ordinarily screw thereinto. Thus, when the switch 16 is turned on, the current, instead of flowing to the filament of a lamp, located directly in the socket 17, flows through the wires 14 to the filament of the corresponding bulb, or lamp 12, and lights the same.

I, preferably, provide a small purse-like case 19 for the reception of the battery casing 15, and I slot the top wall of this purse-like case, at 20, so that the switch 16 will be readily accessible at all times. Since the wires 14 extend downwardly behind the lining 7, and pass out through said lining to the source of current supply, at a point close to the latter, as illustrated in Fig. 1, it will be apparent that these wires serve as an anchoring means for the battery and this purse-like case.

The utility of the device will be readily apparent. By lighting the bulb 12, the contents of the handbag will be illuminated. Door keys may be found in the dark. The correct carfare may be secured from the purse while waiting in the dark for a street car, or any of the contents of the handbag, such as papers, or the like, may be inspected by the aid of the light, at will. However, the device has a utility that goes beyond the mere inspection of the contents of the handbag.

By using the mirror as a reflector, and shifting it to varying angles, rough or muddy places in the roadway may be illuminated, if occasion requires. In addition, the light is of great utility in the making of the toilet. In the application of either rouge or powder, the light serves to illuminate the face. I may, if desired, provide a small shield 21, of opaque material, to cover the upper half of the light, so that the eyes of the user will be shielded from the light, while the lower portion of the face, and particularly the lips will be illuminated by the light reflected from the mirror. At such a time, the shifting of the mirror to varying angles will illuminate any desired portion of the face or neck, to facilitate the application of either lipstick, rouge or face powder, while, at the same time, the user will not be blinded by direct rays of the lamp.

From the foregoing description, it will be seen that I have devised a very simple and inexpensive method of installing an illuminating means in a handbag; that I have utilized parts already on the market, which can be secured at a relatively small cost, and that I have so combined and arranged these parts that the mirror is caused to serve the double function of a mirror and a reflector, and the wires 14 are caused to serve the double function of current conducting means and anchoring means for the battery.

Further, it will be seen that I have combined and correlated the parts in such way as not to detract from the appearance of the handbag. The battery is enclosed in a purse-like element, which adds to the appearance of the completed article, and the leather case 13 may be made of the same material as the outside 6 of the handbag, so that if an attractive lining 7, and an ornamental mirror 8, are used, the whole structure will be extremely attractive in appearance.

It will be noted that in order to renew the battery, it is only necessary to open the purse-like casing, and unscrew the battery casing from the base 18. Thereupon a new battery casing may be screwed into place upon said base, and the purse-like casing closed.

It is to be understood that the invention is not limited to the precise arrangement set forth, but that it includes within its purview whatever changes fairly come within either the terms or spirit of the appended claims.

Having described my invention, what I claim is:

1. The combination with a lady's handbag, of a mirror flexibly suspended from an inner wall thereof, an electric light carried by the mirror and projecting forwardly and downwardly therefrom, and a battery in the bottom of the handbag, and connecting wires between the electric light and the battery.

2. The combination with a lady's handbag, of a mirror flexibly suspended from an inner wall thereof, an electric light carried by the mirror and projecting forwardly and downwardly therefrom, and a battery in the bottom of the handbag, and connecting wires between the electric light and the battery, said wires extending downwardly between the lining of the handbag and the outer wall thereof, and serving to anchor the battery in place.

3. The combination with a lady's handbag, of a mirror, located therein and flexibly suspended from a side thereof, adjacent the top, an incandescent light carried by the mirror, an opaque shield for the upper portion of the light bulb, a battery located at the bottom of the handbag, and current conducting wires extending from the battery through the lining of the handbag, and upwardly between the lining and the outer wall of the handbag, and connected to said incandescent light, as and for the purposes set forth.

4. The combination with a lady's handbag, comprising rigid hinged frame members and a flexible bag section connected to said frame members, of a mirror suspended from one of the rigid frame members to hang adjacent the top of the bag, and an electric light mounted upon and bodily tiltable with the mirror, as and for the purposes set forth.

5. The combination with a lady's handbag, comprising rigid hinged frame members and a flexible bag section connected to said frame members, of a mirror suspended from one of the rigid frame members to hang adjacent the top of the bag, and an electric light mounted upon and bodily tiltable with the mirror, and an opaque shield for the upper portion of the light bulb to shade the eyes of the user from the direct rays of the light, while the mirror reflects the rays in the lower portion of the light upon the lower portion of the face of the user.

6. The combination with a handbag comprising a pair of hingedly connected rigid frame members and a flexible bag portion comprising an outer wall and an inner lining, of an illuminating bulb therein adjacent the top thereof, current conducting wires leading from said bulb behind the lining of the bag portion to a point adjacent the bottom of the bag and through the lining near the bottom of the bag to the interior of said bag, a connecting plug to which the lower ends of said wires are connected, and a bodily removable battery adapted to engage said plug.

7. A structure as recited in claim 6, in combination with a purse-like case in which said battery is located, and into which said plug projects for connection with said battery.

8. The combination with a hand bag, of a mirror secured to the inner wall thereof, an incandescent electric light connected to the mirror and projecting forwardly therefrom, a battery, connecting wires between said battery and light, a purse-like case in which the battery is encased, and a switch upon the top of the battery, said purse-like case having a cut-out portion to expose said switch.

In testimony whereof I affix my signature.

SAMUEL B. SHIFFLETT.